(No Model.)

M. D. TEMPLE.
RUBBER BUCKET FOR CHAIN PUMPS.

No. 405,928. Patented June 25, 1889.

Witnesses.
W. Rossiter
F. Mills.

Inventor
Morris D. Temple
By Price & Fisher
Attys.

UNITED STATES PATENT OFFICE.

MORRIS D. TEMPLE, OF CHICAGO, ILLINOIS.

RUBBER BUCKET FOR CHAIN-PUMPS.

SPECIFICATION forming part of Letters Patent No. 405,928, dated June 25, 1889.

Application filed May 2, 1887. Serial No. 236,778. (No model.)

*To all whom it may concern:*

Be it known that I, MORRIS D. TEMPLE, a citizen of the United States, residing at Chicago, county of Cook, State of Illinois, have invented certain new and useful Improvements in Rubber Buckets for Chain-Pumps, of which I do declare the following to be a full, clear, and exact description, reference being had to the accompanying drawings, forming part of this specification.

My present invention has relation to that class of rubber buckets now commonly known in the trade as "expansion rubber buckets," and particularly does it relate to expansion buckets of that character wherein a concavo-convex or cup-shaped rubber, held upon a screw-threaded link, is expanded by means of a nut working upon said link within the cavity of the rubber, which nut is adapted to thrust outwardly the lower rim of the rubber into contact with the wall of the pump-tube, according as the position of the nut is shifted upon the link. An example of this type of bucket is illustrated in Patent No. 316,199, granted to me April 21, 1885.

The object of my present invention is to so form the rubber portion of the bucket that it will at all times closely hug the periphery of the nut and lock or guard the same against all possibility of movement in downward direction at whatever point within the cavity of the rubber the nut may be placed.

To this end my invention consists, primarily, in the combination, with the screw-bolt and expanding-nut, of a rubber having a narrow upper portion encircling the bolt and having a lower portion of greater diameter than the upper portion, and having an open cavity the diameter of which, when the nut is within the top of the cavity, is gradually diminished from top to bottom.

Figure 1:
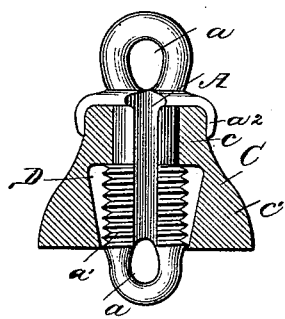
Figure 2:
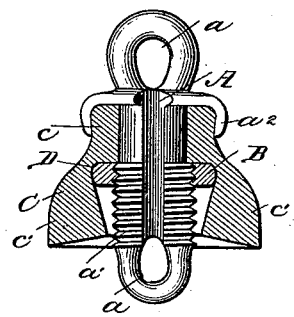
Figure 3:
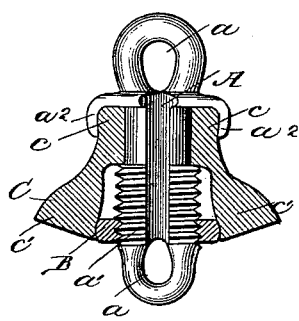
Figure 4:
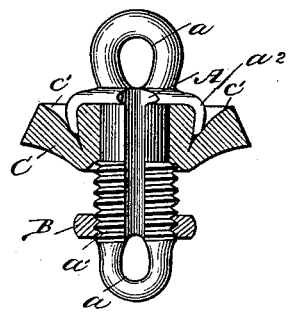
Figure 5:
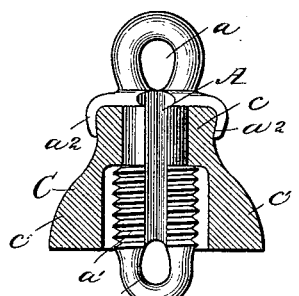
Figure 6:
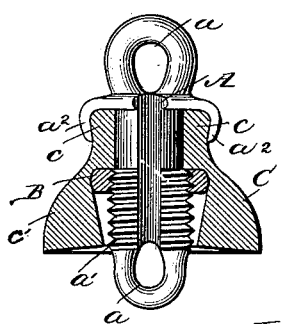

Figure 1 is a view in central vertical section through the rubber of the bucket, the screw-bolt being shown in side elevation and the nut being withdrawn therefrom. Fig. 2 is a view in central vertical section through the rubber and the expanding-nut, the nut being shown at the top of the cavity of the rubber and the rubber being shown in the position assumed when the nut is so placed. Fig. 3 is a view in central vertical section through the rubber and the expanding-nut, the nut being near the base of the rubber in position to thrust outwardly and expand the depending flange or rim thereof. Fig. 4 is a view in central vertical section similar to Fig. 2, but with the rubber rolled back to permit the adjustment of the nut upon the link. Fig. 5 is a view similar to Fig. 1 of a form of bucket having a modified shape of rubber upon the link. Fig. 6 is a view similar to Fig. 2, the rubber in this view being that shown in Fig. 4.

A designates a screw-bolt or link of suitable construction, having its ends provided with eyes $a$ for connection with the adjoining links of the chain, and having its lower portion provided with the screw-threads $a'$ to receive the correspondingly-threaded expanding nut or washer B, the portion of the link immediately above the threads $a'$ being preferably of somewhat reduced diameter to receive the narrow portion $c$ of the rubber C, which closely encircles the link at such point. The link A is preferably formed with the arms or ears $a^2$, which, after the rubber has been placed in position upon the link, will be bent over, as seen in Fig. 1, and forced firmly against the rubber in order to guard against all possibility of the rotation of the rubber upon the link.

The outer face of the rubber C is of general convex shape, as shown, the body of the rubber being of considerably larger diameter at the lower portion than at its top, and within the body of the rubber C, Figs. 1 to 4, is formed a cavity D, the diameter of which is greatest at its top and is gradually diminished from top to bottom, the diameter of the cavity D being, however, at all points less than the diameter of the expanding nut or washer B. By thus forming the cavity D of the rubber of gradually diminishing diameter from top to bottom the wall of this cavity, which constitutes the rim or flange of the rubber, will be increased in thickness from the top of the cavity to the bottom, and the thickened portion $c'$ of the rubber thus formed will tend with greater force to assume a position adjacent the link than will the portion of that part of the rubber adjacent the upper portion of the cavity; hence when the nut B is placed upon the link and is moved to the upper portion of the cavity D of the rubber the rubber will assume substantially the position shown in Fig. 2 of the drawings, and the diameter of the bucket will not be increased. When the nut B is thus placed at the top of the cavity D, the comparatively thin wall of the rubber opposite the top of the cavity will be forced slightly outward, while the lower thicker part $c'$ of the rubber will be caused to assume the position shown in Fig. 2 of the drawings by reason of the resistance which this thickened portion offers to the expansive action of the nut. When the bucket is first put in use, the nut B will be thus placed at the top of the cavity D of the rubber and the bucket will be at its smallest diameter, and it will be observed that when the nut is in this position the inclined wall of rubber will bear firmly against its periphery, and thus guard against all possibility of the nut accidentally working downward upon the link in the operation of the pump.

When the periphery of the rubber C of the bucket has become worn by long usage, the lower portion $c$ of the rubber will be turned upward into the position shown by Fig. 4 of the drawings, and the nut will be moved to a lower position upon the link, as shown in Fig. 3, the extent of this downward movement of the nut depending upon the amount of expansion necessary to be given to the periphery of the rubber in order to compensate for the wear that may have occurred. When the nut is thus moved downward upon the link and opposite a thicker portion of the overhanging flange or rim of the rubber, it will force outward this flange or rim, which at the same time will firmly hug the periphery of the nut and guard against all possibility of its accidental working farther downward upon the link. It will thus be seen that whatever position the nut may occupy upon the link and within the cavity of the rubber, whether at the top or at any point intermediate the top and bottom of the cavity, the depending flange or rim of the rubber constituting the wall of the cavity will firmly hug the periphery of the nut and avoid all possibility of its accidental movement in downward direction.

In the modified form of bucket shown in Figs. 5 and 6 of the drawings the rubber C is formed with a cavity D, the diameter of which, before the nut is placed therein, is uniform from top to bottom, and is slightly larger than the diameter of the threaded portion of the link. When, however, the nut B, which is of considerably greater diameter than the cavity of the rubber, has been placed upon the link and at the top of the cavity, as seen in Fig. 6, the rubber will be forced into such shape that the cavity will be of gradually-diminishing diameter from top to bottom, and the thickened flange or rim $c'$ of the rubber will closely hug the periphery of the nut B and guard the same against all possibility of accidental downward movement at whatever point the nut B may be placed within the cavity from top to bottom thereof.

Having thus described my invention, what I claim as new, and desire to secure by Letters Patent, is—

1. In an expansion rubber bucket for chain-pumps, the combination, with the screw-bolt and the expansion nut or washer, of a rubber having a narrow upper portion encircling the bolt and having a lower portion of greater diameter than the upper portion, and having an open cavity the diameter of which is at all points less than the diameter of the nut and is gradually diminished from top to bottom when the nut is in position at the top of the cavity, substantially as described.

2. In an expansion rubber bucket for chain-pumps, the combination, with a screw-bolt and the expansion nut or washer, of a rubber having a narrow upper portion encircling the bolt and having a lower portion of greater diameter than the upper portion, and having an open cavity the surrounding wall of which is of increased thickness from top to bottom of the cavity, the diameter of said cavity being gradually and continuously diminished from top to bottom, substantially as described.

MORRIS D. TEMPLE.

Witnesses:
GEO. P. FISHER, Jr.,
J. B. CARPENTER.